United States Patent Office 3,687,717
Patented Aug. 29, 1972

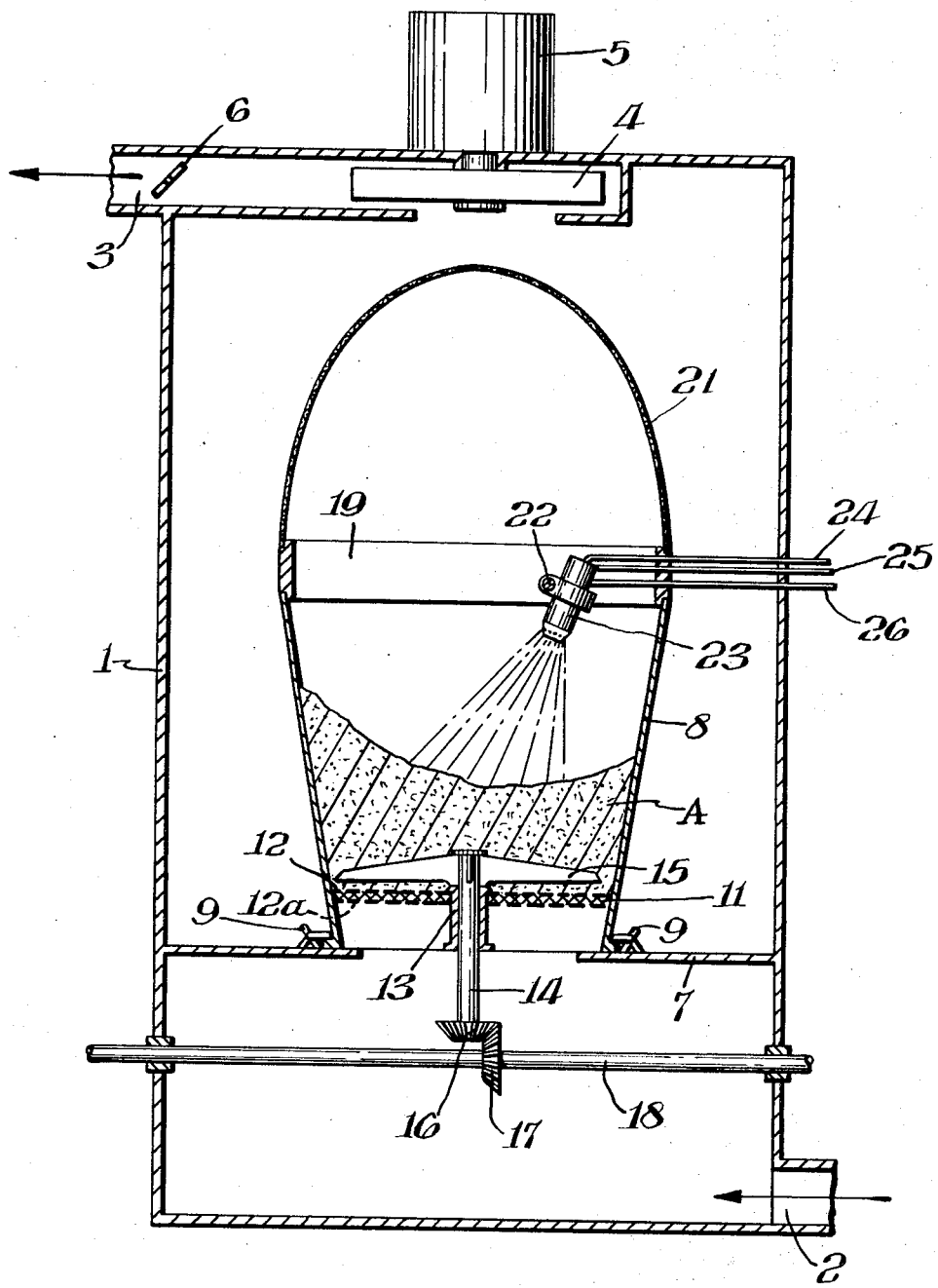

3,687,717
METHOD OF COATING PARTICLES BY ROTATING A FLUIDIZED BED OF THE PARTICLES
Derek A. Philip, Loughton, England, assignor to Pfizer Inc., New York, N.Y.
Filed July 7, 1969, Ser. No. 839,275
Claims priority, application Great Britain, July 26, 1968, 35,733/68
Int. Cl. B44d 1/08
U.S. Cl. 117—100 A      10 Claims

ABSTRACT OF THE DISCLOSURE

Finely divided particles are coated by spraying the coating material onto a rotating fluidized bed of the particles. Anhydrous citric acid particles of approximately 100 mesh size are thus sprayed with a solution of fully hydrogenated lard in isopropanol; enzyme particles are thus sprayed with a solution of polyethylene glycol in carbon tetrachloride, or hydroxypropyl methyl cellulose in a methylene chloride-industrial alcohol mixture. The bed is maintained at a low enough temperature by the flow of air through it so that the particles do not melt and the sprayed coating does not flow. The bed is contained above a screen in a cylindrical vessel and a paddle within it rotates it about the longitudinal axis. The coating solution is atomized and sprayed in a heated form to facilitate dispersion of the coating material. The top of the vessel is foraminous to permit passage of the air stream which creates the fluidized bed and to prevent the particles from being drawn out with it.

BACKGROUND OF THE INVENTION

Particulate materials whose particles are coated (usually with a complete coating around the particle, but sometimes with only a partial one) find use for various purposes, in accordance with the modification of properties that coating produces. Thus, coating may render the underlying solid material generally more stable, or may decrease its rate of physical dissolution or of chemical reaction under particular conditions, or may reduce any tendency that the material has to cake on storage.

Among the methods that are available for the coating of materials generally are those which involve spraying the material with a coating medium in liquid form. However, application of available spray-coating methods to material that is particulate often leads, especially with finely divided particulate materials, to formation of a product in which not only a high proportion of the particulate material has become agglomerated, but also within that proportion agglomeration has occurred to a widely varying extent. Such extensive departure from uniformity of particle size can often be a serious disadvantage in use.

SUMMARY OF THE INVENTION

The present invention provides a new method of spray-coating particulate material. The method can be applied generally, but is of special value in coating finely divided particulate material, for example, material of particle size 10 mesh U.S. sieve and smaller.

The finely divided particles to be coated are maintained in the form of a fluidized bed which is rotated, usually mechanically, about a vertical axis. An atomised spray of liquid coating material is sprayed downwardly upon or into said rotating fluidized bed. The temperature of the bed is maintained substantially below the melting range of said coating material by the flow of air through which it remarkably sets or dries the coating material so that it does not flow and does not agglomerate the particles.

The liquid coating medium employed may be a molten coating material, but is preferably a solution or dispersion of coating material in a liquid which becomes volatilised in the course of the coating operation. Specific applications include the coating of anhydrous citric acid with a hot spray of fully hydrogenated lard in isopropanol; and the coating of enzyme preparations to be used in detergent compositions (such as described on pages 6 and 7 of British patent specification 1,151,748) with a hot spray of polyethyleneglycol (molecular weight range of 3000–3700) in carbon tetrachloride, or a hot spray of hydroxypropyl methyl cellulose in a methylene chloride-industrial alcohol mixture.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single figure is a cross-sectional view in elevation of an apparatus for performing a method which is one embodiment of this invention.

DESCRIPTION OF THE PREFERRED EMBODIMENT

According to the invention, a coating medium in liquid form is sprayed onto the material maintained in the form of a fluidized bed that is rotated.

The fluidized bed is preferably rotated by mechanical means situated within the bed. A paddle stirrer, suitably operated at a speed of 100 r.p.m. or more, can very conveniently be used to rotate the bed. A preferred speed of rotation of the stirrer is in the range 500–1000 r.p.m. The stirrer is preferably rotated about a vertical axis, but this is not essential in order to achieve corresponding rotation of the bed. Thus, there are certain known forms of apparatus (for example, the NAUTA VOMETEC fluid bed reactor) in which there is provision for introduction of a spray of liquid medium upwardly into the particulate material maintained in the form of a fluidized bed, and such apparatus can conveniently be adapted for use in carrying out the invention by equipping it with a paddle stirrer mounted to rotate on a horizontal axis at the surface of the bed. Adaptation in this way enables the bed to be rotated about a vertical axis but avoids having to modify the means for introduction of coating liquid.

Maintaining the particulate material in the form of a fluidized bed is usually made easier by employing material from which the finest particles (of diameter less than about 10 microns) have been removed, as by air classification.

It is critical for coating finely divided particles that the liquid coating applied to said particles solidify as quickly as possible and that the particles be prevented from agglomerating into larger particles by adhering to each other during the coating operation. The rotation of the particle bed ensures that all the finely divided particles become evenly coated and that the bed maintains a homogeneous temperature throughout, which is substantially below the temperature at which the coating material flows. This flow terminology is used because many coating materials do not have sharp melting points, but melting ranges. What is meant by "flow" for these substances is the temperature at which the liquid coating material becomes sufficiently rigid such that there is substantially no flow of the coating material from the surface of the coated particulate matter. This prevents excessive agglomeration of the finely divided particles by adhering to each other, in that the liquid coating is allowed to solidify quickly. Also, rotation prevents pockets of wet particles from accumulating within the bed and allows for exposure of the wet particles to the fluidizing gas for quicker cooling and solidification of the coating.

Furthermore, to effect substantially complete and rapid coating of the finely divided particulate matter, without excessive agglomeration of said matter, the liquid coating is applied in the form of an atomised spray. This ensures an even application of the liquid coating to the particle surfaces and promotes rapid solidification of the coating once it is adhering to the particle surface.

The liquid coating medium employed may be a molten coating material, but is preferably a solution or dispersion of coating material in a liquid (e.g., methylene chloride-industrial alcohol mixtures, hexane, isopropanol, and carbon tetrachloride) which becomes volatilized in the course of the coating operation. Thus, the invention can be applied to the coating of a wide variety of particulate materials (e.g., citric acid, sodium dihydrogen citrate, sodium bicarbonate, sorbic acid, gluconodeltalactone, and commercial enzyme preparations such as protease preparations used for incorporation in detergent compositions) using waxes, resins, glycerides, long chain fatty acids, cellulose ethers, non-ionic surface active agents and other coating materials.

Temperature control of the fluidized bed is important to ensure that such temperature is low enough so that the coating material does not flow. This allows the coating to quickly solidify on the particle surface, preventing the formation of agglomerated particles by adjacent particle surfaces sticking together. In the case where the coating material is applied in the form of a liquid solution or dispersion containing said coating material, it is important that when the soluton coats the particles, the liquid volatilizes leaving behind said coating material which solidifies. Thus, it is understod that the temperature of the fluidized bed must be maintained such that it is low enough for the coating material to solidify on said particle surface; but allows for the volatilization of the solvent where a liquid coating solution is employed; and of course is not high enough to melt the coated particles. Someone skilled in the art can make the proper choice of coating material and temperature control for coating a specified particulate substance.

Temperature control can be easily effected either by controlling the temperature of the fluidizing gas or by interrupting the spraying of the hot liquid coating material to allow the temperature of the fluidized bed to go down to acceptable levels. This does not of course exclude other methods of temperature control available to someone skilled in the art.

Specific application of the invention is found in the coating of finely divided anhydrous citric acid. The coated acid particles are useful for releasing acidity in a controlled manner in a variety of formulations as the temperature is raised. The coated acid is particularly suited for use in baked goods. Non-coated acid would be unacceptable in this type of application due to an uncontrolled acid release leading to violent reactions and premature aeration of the baked goods. Also, coating of enzyme preparations (e.g., the preparations described on pages 6 and 7 of British patent specification 1,151,748) to be commercially available for incorporation in detergent compositions is another specific application of the invention.

The following examples are provided for illustrative purposes and should not be interpreted as limiting the invention, the scope of which is defined by the appended claims.

Example I

There will now be described the application of the invention to the production from anhydrous crystalline citric acid of a free-flowing non-caking powder suitable for use as an acidic ingredient of dry mixtures such as baking powders. A form of apparatus suitable for use in the method is illustrated in the accompanying drawing, which is partly a vertical section and partly diagrammatic.

The apparatus comprises a casing 1 having at its lower end an inlet duct 2 for fluidizing gas and at its upper end an outlet duct 3, within which is situated the blades 4 of a centrifugal fan 5 for drawing gas through the system and an adjustable baffle 6 for regulating the flow of gas. Within the casing is an annular platform 7 which supports a vessel 8, whose side walls are prolonged downwardly beyond the vessel's floor to define an aperture which is concentric with that in annular platform 7. The vessel 8 is clamped to the platform 7 as indicated at 9, and is accessible for detachment and withdrawal from casing 1 by means of a door (not shown) in the casing.

The floor of the vessel 8 is constituted by a gauze 11 situated between two perforated plates 12 and 12a. The plates support a sleeve 13, in which is mounted a shaft 14, to which is keyed a stirrer having paddles 15. The shaft 14 is arranged to be driven by gear wheels 16 and 17 and drive shaft 18 coupled to a variable drive electric motor (not shown).

The vessel 8 has detachably fastened to its upper part a ring 19 supporting a filter hood 21 which prevents loss of fluidized material from the vessel. The ring 19 also carries a bar 22 which supports a spray head 23 connected to valve-operated lines 24, 25 and 26, which are respectively: an air line for the supply of compressed air to operate pneumatic valve mechanism in the spray head; a line for the supply of coating medium under pressure; and a line for the supply of compressed air to atomise liquid coating medium as it issues from the spray head.

Those parts of the apparatus (including gauze 11) that are to come into contact with particulate material to be coated and with coating medium are suitably made of stainless steel. The filter hood 21 is suitably of cloth.

Operation: With citric acid (ground to pass a 120 mesh U.S. sieve) in vessel 8, the fan 5 is started to cause air to be drawn via inlet 2 through gauze 11 (here chosen to be of size 160 mesh) at a rate such that the citric acid in the vessel is just fluidized. Paddle stirrer 15 is started to cause rotation of the fluidized bed and set at a suitable speed, e.g. 700 r.p.m.; and the baffle 6 in outlet duct 3 is then adjusted until a rotating fluidized bed (indicated by A in FIG. 1) of suitable depth is formed.

Coating medium in liquid form is then fed to spray head 23, simultaneously with atomizing air for production of a spray of the medium. The coating medium is suitably a hot (approximately 75° C.) solution of 75 parts by weight of fully hydrogenated lard (of slip point 58° C. and melting range 58.9 to 60.3° C.) in 15 parts by weight of isopropanol. Spraying of the hot coating medium may be required to be interrupted from time to time, so as to ensure that the temperature of the bed remains well below the temperature at which the lard flows when deposited upon the particles. At the conclusion of the coating operation, the citric acid particles coated with lard are recovered from the apparatus and sifted through 60 and 200 mesh U.S. sieves to remove minor proportions of oversize material and fines.

Example II

The procedure described in Example I is followed, except that the coating medium employed consists of 75 parts by weight of fully hydrogenated lard dissolved in 25 parts by weight of carbon tetrachloride and the particulate material to be coated is sodium bicarbonate. Similar results are obtained.

Example III

The procedure described in Example II is followed, substituting sodium dihydrogen citrate for sodium bicarbonate and similar results are obtained.

Example IV

The procedure described in Example II is followed, substituting sorbic acid for sodium bicarbonate and similar results are obtained.

Example V

The procedure described in Example II is followed, substituting gluconodeltalactone for sodium bicarbonate and similar results are obtained.

Example VI

The procedure described in Example I is followed, substituting for anhydrous crystalline citric acid an enzyme preparation to be used in detergent compositions (such as described on pages 6 and 7 of British patent specification 1,151,748) and a coating medium consisting of 50 parts by weight of polyethyleneglycol (sold under the registered trademark, Carbowax 4000) dissolved in 50 parts by weight of carbon tetrachloride. This particular polyethyleneglycol has a molecular weight range of 3000 to 3700, specific gravity of 1.204 g./ml. at 20° C., a freezing range of 53–56° C., and a viscosity of 75 to 85 centistokes at 210° F. Also, the coating medium is sprayed at a temperature of 80° C., with the speed of rotation of the paddle stirrer being set at 1000 r.p.m. Similar results are obtained.

Example VII

The procedure described in Example VI is followed, except that the coating medium used consists of 5 parts by weight of hydroxypropyl methyl cellulose dissolved in 95 parts by weight of a mixture of methylene chloride (70 parts by weight) and industrial alcohol (30 parts by weight) and similar results are obtained.

What is claimed is:

1. A method of coating finely divided solid particles ranging from about 10 to about 160 mesh particle size with a solid coating material to form discrete coated particles which comprises: aerating said solid particles to form a fluidized particle bed, rotating said fluidized bed about a vertical axis by rotating within it and about said vertical axis paddle blades substantially aligned with said vertical axis at a speed of at least 100 r.p.m., spraying a solidifiable coating material in the form of an atomised liquid spray onto said rotating fluidized bed substantially below the melting range of said coating material, whereby the coating material is deposited on said particles at a temperature low enough so that it does not flow and does not agglomerate said particles.

2. The method of claim 1 wherein the liquid coating medium employed is a solution of solidifiable coating material in a liquid, said liquid becoming volatilized during the course of the coating operation.

3. The method of claim 2 wherein said particles consist of finely divided anhydrous crystalline citric acid.

4. The method of claim 2 wherein said particles consist of finely divided crystalline enzyme.

5. The method of claim 2 wherein said coating medium is a solution consisting of 75 parts by weight of fully hydrogenated lard in 15 parts by weight of isopropanol, said lard having a melting range of 58.9 to 60.3° C., and said solution is sprayed at a temperature of approximately 75° C.

6. The method of claim 5 wherein said coating medium is a solution consisting of 75 parts by weight of fully hydrogenated lard in 25 parts by weight of carbon tetrachloride.

7. The method of claim 2 wherein said coating medium is a solution consisting of 50 parts by weight of polyethyleneglycol in 50 parts by weight of carbon tetrachloride, said polyethyleneglycol having a molecular weight range of 3000 to 3700, and said solution is sprayed at a temperature of approximately 80° C.

8. The method of claim 2 wherein said coating medium is a solution consisting of 5 parts by weight of hydroxypropyl methyl cellulose in 95 parts by weight of a mixture consisting of 70 parts by weight of methylene chloride and 30 parts by weight of industrial alcohol, and said solution is sprayed at a temperature of approximately 80° C.

9. The method of claim 1 wherein the temperature of the rotating fluidized bed is maintained by the flow of air through it.

10. The method of claim 1 wherein said paddle blades are rotated at a speed ranging from 500 to 1000 r.p.m.

References Cited

UNITED STATES PATENTS

| | | | |
|---|---|---|---|
| 2,164,936 | 7/1939 | Miller et al. | 195—68 |
| 2,561,395 | 7/1951 | Marshall | 117—100 X |
| 2,642,376 | 6/1953 | Gale et al. | 195—63 |
| 3,006,815 | 10/1961 | Scott | 195—68 |
| 3,106,492 | 10/1963 | MacDonald | 117—100 |
| 3,112,274 | 11/1963 | Morganthaler et al. | 117—100 X |
| 3,131,068 | 4/1964 | Greif et al. | 117—100 X |
| 3,145,146 | 8/1964 | Lieberman et al. | 117—100 X |
| 3,154,494 | 10/1964 | Speak et al. | 117—100 X |
| 3,472,783 | 10/1969 | Smillie | 117—100 X |
| 3,519,570 | 7/1970 | McCarty | 117—100 X |
| 2,308,992 | 1/1943 | Mertens | 117—100 X |
| 3,089,824 | 5/1963 | Wurster | 117—100 X |
| 3,152,005 | 10/1964 | Tuttle | 117—100 X |
| 3,202,731 | 8/1965 | Grevenstuk et al. | 117—100 X |

FOREIGN PATENTS

| | | | |
|---|---|---|---|
| 1,151,748 | 5/1969 | Great Britain | 117—100 X |

OTHER REFERENCES

Yasumatsu et al.: "Stabilities of Enzymes in Polyhydric Alcohols," Agr. Biol. Chem. vol. 29, No. 7, pp. 665–671, 1964.

Bailey: Industrial Oil and Fat Products, Interscience Publishers Inc., 1945, Waverly Press pp. 227–230, New York, N.Y.

Hackh: Hackh's Chemical Dictionary, pp. 467, 530, P. Blakiston's Son & Co., Inc., 1937.

WILLIAM D. MARTIN, Primary Examiner

M. R. P. PERRONE, Jr., Assistant Examiner

U.S. Cl. X.R.

117—161 UE, 166, 167; 118—303; 195—56, 63, 68; 260—535 P